Aug. 17, 1965

D. B. LEVINS 3,200,645

ELECTRIC POSITION SENSOR

Filed May 22, 1963

INVENTOR.
DAVE B. LEVINS
BY Richard E. Harley
HIS ATTORNEY

Aug. 17, 1965

D. B. LEVINS 3,200,645

ELECTRIC POSITION SENSOR

Filed May 22, 1963

INVENTOR.
DAVE B. LEVINS

BY Richard E. Horley

HIS ATTORNEY

Aug. 17, 1965  D. B. LEVINS  3,200,645
ELECTRIC POSITION SENSOR
Filed May 22, 1963  3 Sheets-Sheet 3

INVENTOR.
DAVE B. LEVINS
BY Richard E. Hosley
HIS ATTORNEY

United States Patent Office 3,200,645
Patented Aug. 17, 1965

3,200,645
ELECTRIC POSITION SENSOR
Dave B. Levins, Swampscott, Mass., assignor to General Electric Company, a corporation of New York
Filed May 22, 1963, Ser. No. 282,395
4 Claims. (Cl. 73—313)

The present invention relates to position sensors and more particularly to electric position sensors of the variable resistance type. Such devices are commonly used to control the flow of electric current or voltage to a remotely located indicator to provide indication of mechanical motion of a device coupled to the sensor.

Electric position sensors of the potentiometer type are well known, such devices having been used to transmit various kinds of mechanical motion such as, for example, the position of a float measuring level of liquid in a tank thereby providing indication of liquid level. One such device is shown, for example, in Patent 2,248,616, Faus.

Electric position sensors of the potentiometer type, while satisfactory for many applications, have the disadvantage that faulty electrical contact between the wiper arm of the potentiometer and the resistance due to wear, corrosion, dirt, or some other cause may cause a failure or malfunction of the sensor. Also, where such devices are used in an explosive atmosphere or in or near combustible fluids, there is a dangerous fire or explosion hazard. While these devices can be enclosed in sealed containers, the resulting construction tends to be bulky and expensive.

Accordingly, it is an object of this invention to provide an electric position sensor of the variable resistance type that is extremely reliable, being entirely free from contact corrosion problems.

Another object of the invention is to provide an electric position sensor that is free from hazard due to sparking contacts.

A further object of the invention is to provide a position sensor that can be conveniently packaged in a measurement probe especially well suited for measurement of level of liquid in a tank where space is limited and reliability and safety are important, such as an oil or fuel tank carried on aircraft.

Further objects and advantages of my invention will be apparent as the following description proceeds.

Briefly, in accordance with this invention there is provided an electric position sensor comprising a series of hermetically sealed, magnetically actuated switches mounted along the length of a measurement probe. Associated with these switches are a plurality of serially connected resistors having end connections and intermediate connections between the resistors. One of the contacts of each switch is connected to a common conductor. The other contact of each switch is connected to different ones of the intermediate connections so that the electrical resistance between the common conductor and one of the terminal connections progressively changes as the switches are progressively closed along the length of the probe. A magnet member moving along the probe provides a magnetic field actuating individual switches when in juxtaposed relation therewith and thereby changes the resistance between the common conductor and the terminal connections depending on the position of the magnet. Functioning as a liquid level position sensor, the magnet member is positioned by a float rising and falling with the level of liquid in a tank.

The switches used are of the magnetic reed type, being hermetically sealed in an elongated casing. These switches are extremely reliable, being suitable for billions of operations before failure. Also, because the contacts are enclosed in a hermetically sealed container, there is no danger from sparking contacts. Further, these switches are sensitive to magnetic flux along the longitudinal axis of the switch. This permits the use of a helical overlapping pattern of switches disposed along the length of the probe, making possible certain sequencing action of the switches, which greatly increases the resolution of the sensor without using a large number of switches as will be more fully described below.

For a better understanding of the invention, reference should be made to the following detailed description taken in connection with the accompanying drawings in which.

Figure 10:
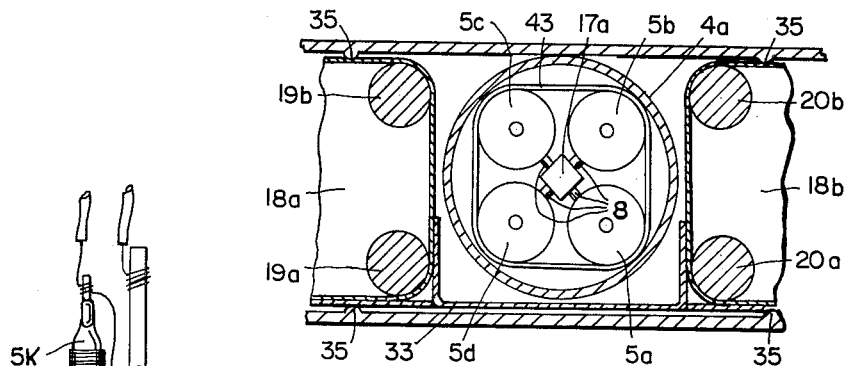
Figure 11:
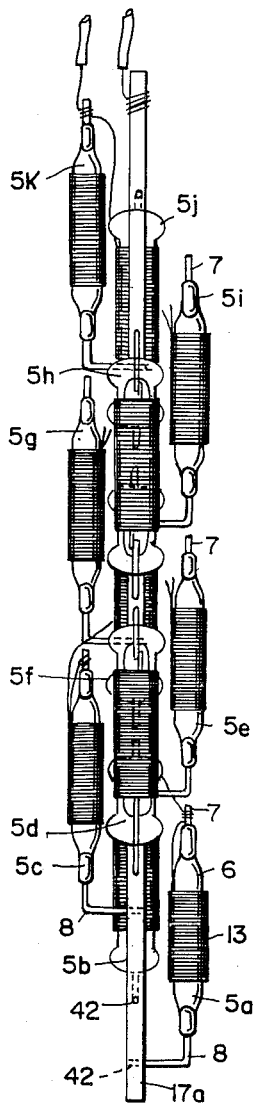
Figure 7:
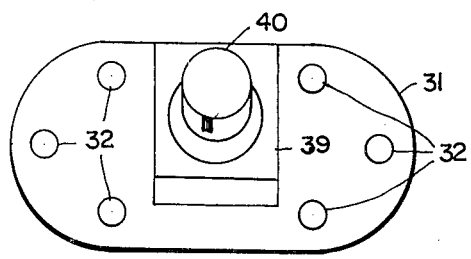
Figure 8:
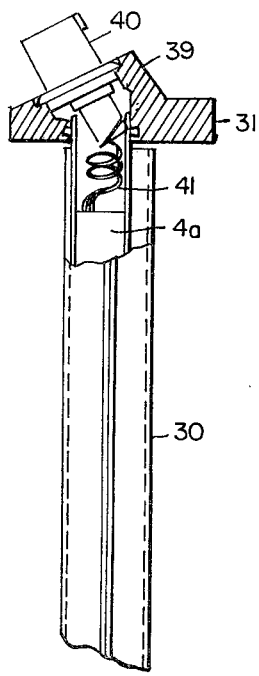
Figure 9:
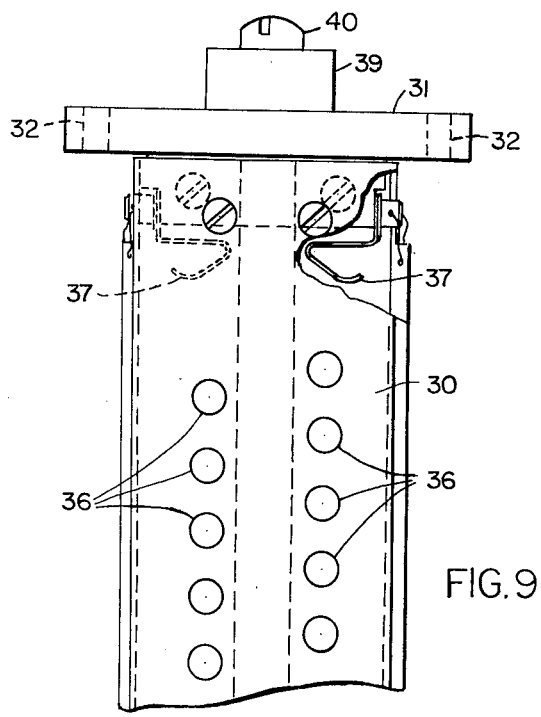
Figure 12:
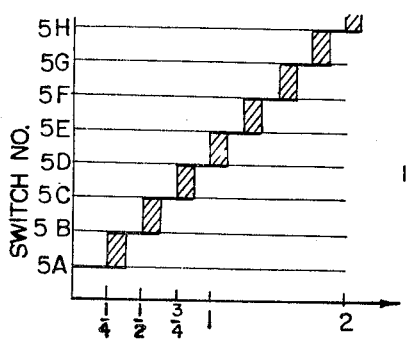

FIGURES 7, 8, and 9 are, respectively, top, side elevation, and front elevation views of a commercial embodiment of the invention in a liquid level probe forming a part of a liquid level indicating system;

FIGURE 10 is a cross-sectional view of the probe taken along the section line 9—9 of FIGURE 9 showing certain details of construction;

FIGURE 11 is a view of the inner part of the probe showing the manner in which the magnetic reed switches are supported on a common conducting member and arranged in an overlapping helical configuration; and FIGURE 12 is a graphic representation useful in explaining the sequence of operation of the overlapping magnetic reed switches.

Figures 1, 2, 3:
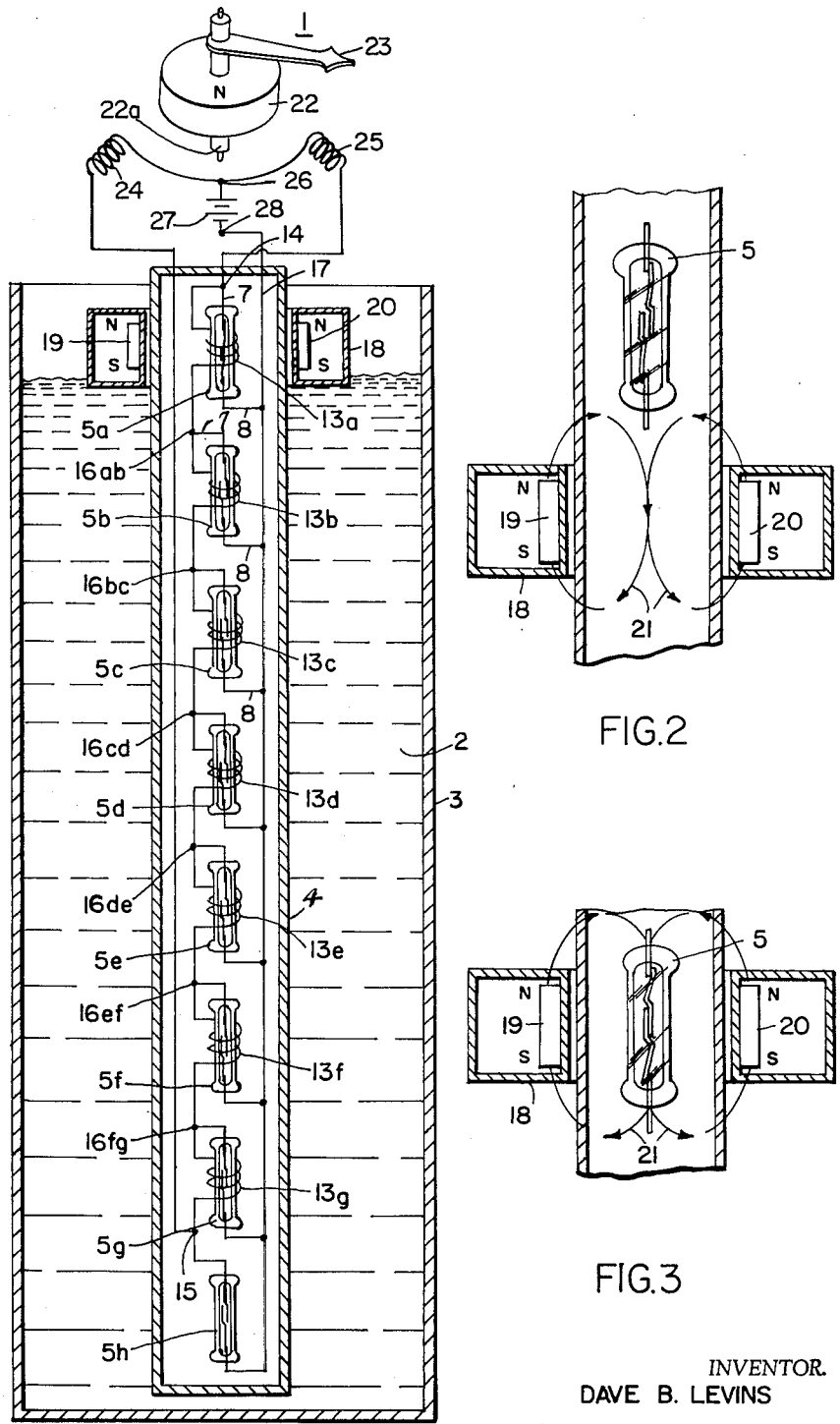
FIGURE 1 shows a liquid level indicator system in schematic form embodying an electric position sensor constructed in accordance with the invention.
FIGURES 2 and 3 show different operative positions of a magnetic actuator relative to a magnetic reed switch utilized as a component of the sensor.

Referring to FIGURE 1 of the drawing, there is shown in schematic form an electric position sensor or probe embodying the invention arranged to transmit electric signals to an indicator 1 to indicate the level of a fluid 2 contained in a tank 3. As shown, the sensor comprises a housing 4 supported in the tank and projecting downwardly into the liquid the level of which is to be measured. Mounted along the length of the housing in vertically spaced relation are a plurality of magnetically actuated switches 5, the various switches being differentiated by the subscripts $a$ to $h$, inclusive.

Figure 4:
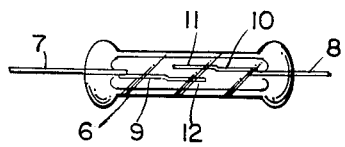
FIGURE 4 shows constructional details of the magnetic reed switch.

The magnetically actuated switches are preferably of the reed type shown, for example, in Patent 2,289,830, Ellwood. As best shown in FIGURE 4 of the drawing, the magnetic switch comprises a hermetically sealed, elongated casing 6 of suitable insulating material such as glass. Extending through the ends of the casing 6 in sealed relation are terminal wires 7 and 8. Disposed within the casing are two resilient circuit-making springs 9 and 10 having a rectangular cross section and formed of magnetic material such as iron, the outer ends of the springs being welded or otherwise suitably secured and electrically connected to the inner ends of terminal wires 7 and 8. The inner contact-making ends of the springs form contacts 11 and 12 normally lying as shown in spaced, overlapping relation. When the springs are excited by a magnetic field passing axially through the casing, the springs move to a minimum reluctance position in which the contacts 11 and 12 are drawn together, thus completing an electric circuit path between terminal wires 7 and 8. Thus, the springs function as resilient switch arms normally maintaining the contacts in the open position and also act as magnetic armatures closing the contacts when subjected to a magnetic field extending along the length of the springs. The casing 6 is preferably filled with a suitable inert gas such as helium, argon, or neon to prevent corrosion of the contacts. Switches of this type are extremely reliable and are rated for billions of operations.

Figure 5:
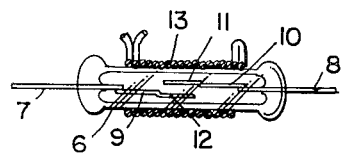
FIGURE 5 shows an arrangement wherein a resistor is in the form of a coil wound on the switch casing.

Also disposed within the housing 4 are a plurality of resistors 13, the various resistors being differentiated by subscripts $a$ to $g$, inclusive, there being one resistor associated with each switch 5 except the bottom switch $5_h$. In the interest of reducing the size of the probe and the amount of interconnecting wiring, the resistors 13 may, as shown, be in the form of coils wound on the exterior of switch casing 6 as best shown in FIGURE 5 of the drawing. The resistor coil winding is doubled back in a so-called noninductive winding so as not to produce a magnetic field resulting from current flowing in the resistor coils that might otherwise affect the operation of magnetic switch 5.

The resistor coils 13 are, as shown, connected in series-circuit relation to provide end connections 14 and 15 and a plurality of intermediate connections or junctions 16 between the resistors. The junction between resistor coils $13_a$ and $13_b$ is designated as $16_{ab}$, between resistor coils $13_b$ and $13_c$ as $16_{bc}$, etc.

One terminal wire 8 of each magnetic switch 5 is connected to a common conductor 17 while the other terminal wire 7 for the upper and lower switches $5_a$ and $5_h$ are connected, respectively, to the end connections 14 and 15 of the series-connected resistors 13. The terminal wires 7 of the intermediate switches $5_b$ to $5_g$, inclusive, are connected to the associated junctions 16. Thus, terminal wire 7 of switch $5_b$ is connected to junction $16_{ab}$; terminal wire 7 of switch $5_c$ is connected to junction $16_{bc}$, etc. With this arrangement the switches 5 connect the common conductor 17 to different junctions 16 between the resistors 13 or to the end connections 14 and 15. Thus, as the switches 5 are progressively and selectively closed, say in a downward direction, the resistance between the common conductor 17 and the end terminal 14 increases while the resistance between the common conductor 17 and the terminal 15 decreases and vice versa, the action being somewhat like that of a potentiometer having discrete operating positions.

In order to selectively and progressively actuate the magnetic switches 5 in accordance with the level of liquid 1 and thereby provide electric signals indicative of such liquid level, there is provided an annular float 18 surrounding and axially freely movable along the length of probe 4. Mounted inside of the float on the side adjacent the probe are bar magnets 19 and 20 polarized as shown on the drawing and arranged to provide a magnetic field having a return path extending axially of the probe as indicated by the arrows 21 of FIGURES 2 and 3. When the float is displaced from a magnetic switch 5 as shown in FIGURE 2, the magnetic flux of sufficient intensity to actuate the switch does not thread the switch, and the switch contacts 11 and 12 are in the normally open position. When the float slides axially along the housing to a position such as that shown in FIGURE 3 where the magnets lie in juxtaposed relation to the switch, the magnetic flux of sufficient intensity to actuate the switch threads the switch in an axial direction causing contacts 11 and 12 to move to the closed position shown.

To provide an indication of liquid level, the indicator indicated generally by the numeral 1 may be one of several well-known voltage or current sensitive types and may include a servo amplifier if desired. The illustrated form of indicator is a so-called ratio meter comprising a permanent magnet rotor 22 mounted on a rotating shaft $22a$ which also carries a pointer 23. The rotor and pointer are magnetically locked in a position dependent upon the pattern of the magnetic flux generated by coils 24 and 25 the radial orientation of which depends on the relative strengths of the current flowing in these coils. As shown, the coils 24 and 25 have a common connection to one terminal 26 of a source of direct current source 27, the other terminal 28 of which is connected to the common conductor 17. The other ends of the coils 24 and 25 are connected as shown by wires leading from the end connections 14 and 15 of the serially connected resistor coils 13.

The operation of the position sensor to indicate liquid level may now be described as follows:

When the liquid 2 in tank 3 is near the top or "full" position, the float 18 occupies the position shown in FIGURE 1 wherein the magnets 19 and 20 provide a magnetic flux linking and closing switch $5_a$, the remaining switches being open. The closing of the switch connects indicator coil 25 directly across the power supply 27 with minimum resistance and hence maximum current flow therein. At the same time coil 24 of the indicator is connected to the power supply through all of the series-connected resistors 13 causing minimum current flow therein. The resulting flux pattern generated by the coils 24 and 25 causes the rotor 22 and pointer 23 to swing to the right or "full" position. When the tank is empty, float 18 rests on the bottom in which position the flux from magnets 19 and 20 links switch $5_h$ causing it to close with all of the remaining switches open. This connects all of the series resistors 13 in circuit with the coil 25, resulting in minimum current flow therethrough whereas the coil 24 is connected directly across the power supply 27 with minimum resistance and maximum current flow therein. This causes the pointer 23 and the rotor 22 to swing to the left or "empty" position. For intermediate positions wherein the float 18 and magnets 19 and 20 lie in juxtaposition with different magnetic switches, the closure of the adjacent switch will connect the various combinations of the resistors 13 in series with the indicator coils 24 and 25 whereby the rotor 22 and pointer 23 occupy intermediate positions, there being a particular position of the rotor and pointer for each magnetic switch in the closed position. For example, when the float 18 lies opposite switch $5_d$ causing closure thereof, the resistor coils $13_a$, $13_b$, and $13_c$ are connected in series with the indicator coil 25 while the resistors $13_d$, $13_e$, $13_f$, and $13_g$ are connected in series with the indicator coil 24. As a result, the current through indicator coil 25 is somewhat greater than that through indicator coil 24 because of a smaller net resistance in circuit with that coil, and as a result the rotor and pointer will occupy a characteristic position somewhat to the right of center indicating that the tank is somewhat more than half full. Thus, as the magnetic switches 5 are progressively closed, say from the top to the bottom, the pointer moves from the full to the empty position and vice versa, thereby providing an indication of liquid level in the tank.

Figure 6:
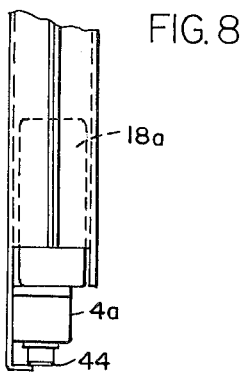
FIGURE 6 shows another form of indicator system that may be used to indicate the output of the sensor.
Figure 6:
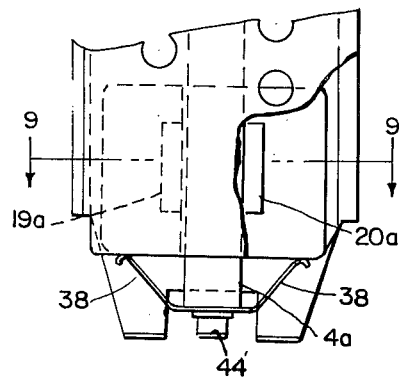

The advantage of using a ratio meter of the type shown in FIGURE 1 is that the system is insensitive to variations in voltage of the power supply 27. Where the power supply voltage is relatively constant, a simple milliammeter 29 may be used, the circuit connection being shown in FIGURE 6.

It will be understood that any suitable number of magnetic switches 5 may be used. The number of switches used depends on the resolution of the indication required. Obviously the greater number of switches and associated resistor coils used, the greater will be the resolution and sensitivity of the indicator.

In FIGURES 7 to 11, inclusive, of the drawing there is shown a commercial embodiment of the electric position sensor forming a part of a liquid level indicating system. This arrangement uses a helical overlapping pattern of switches disposed along the length of the probe, which makes possible sequencing action of the magnetic switches, the result of which is to increase greatly the resolution of the sensor for a given number of switches.

As best shown in FIGURES 9 and 10, the measurement probe comprises a member tubular in shape and is formed of nonmagnetic material which may be, for example, nonmagnetic stainless steel. The probe is enclosed by a rectangular casing 30 which is supported from a flange 31 adapted to be mounted on the top of a closed liquid container such as an oil tank of an aircraft and secured thereto by means of bolts extending through bolt holes 32. As shown in FIGURE 10, the tubular housing 4a is secured to one side of the interior to the casing 30 in any suitable manner, as by welding.

In this embodiment the float consists of two separate liquid-tight containers 18a and 18b which are rigidly held in spaced relation on opposite sides of the probe 4a by means of a U-shaped bracket 33. The inside of the casing 30 is provided with projections or ridges 35 which act to guide the floats during their vertical path of travel within the casing. In order to permit fluid within the tank to enter casing 30, there are provided in one side of the casing a series of perforations 36. Resilient springs 37 and 38 located at the top and bottom of the casing 30 act as stops to limit the travel of the floats beyond the measurement range and act as resilient bumpers for shock relief. The top side of the flange 31 is provided with an angled boss 39 provided with an aperture for mounting an electrical connector 40 to which extend wires 41 leading to the magnetic switch and resistor elements located within the probe 4a.

Extending axially and centrally of the probe 4a is a common conductor and support member 17a having a square cross section. Magnetic switches $5_A$ to $5_K$, inclusive, are mounted on the common conductor 17a which also acts as a support for the switches in a helical overlapping relation. It will be noted that the lower terminal wire 8 of each of the magnetic switches has right angle bend and projects into holes 42 drilled in the conductor, the terminal wires 8 being suitably secured in position as by soldering. The switches are mounted in an overlapping helical configuration, contiguous switches being displaced 90° around the supports 17 as best shown in FIGURE 11.

In this arrangement four permanent magnets are used with their axes parallel to the axis of the probe. Two of them, 19a and 19b, are disposed in and fastened to float section 18a, and the other two, 20a and 20b, are located in and fastened to float section 18b. The common conductor 17a which supports the switches 5 and resistors 13 is oriented so that there is a magnet closely adjacent to the axis of each vertically aligned row of switches. Thus, the axis of vertically aligned switches $5_A$, $5_E$, and $5_I$ lies adjacent the axis and path of movement of magnet 20a; the axis of switches $5_B$, $5_F$, and $5_J$ lies adjacent the path of movement of magnet 20b; the axis of switches $5_C$, $5_G$, and $5_K$ lies adjacent the path of movement of magnet 19b; and the axis of switches $5_D$ and $5_H$ lies adjacent the path of movement of magnet 19a. This arrangement permits relatively close spacing between the vertically moving magnets and the magnetic switches for more efficient and reliable operation. While eleven switches are illustrated, it will be appreciated that any suitable number may be used.

The length and strength of the bar magnets 19a, 19b, 20a, and 20b is selected relative to the length of the magnetic switches so that the magnetic field produced thereby operates to close a juxtaposed magnetic switch for a predetermined length of vertical travel of the floats 18a and 18b. For the purpose of describing the overlapped relationship of the magnetic switches and the sequencing operation to be described, it will be assumed that the magnet length is chosen so that its closes a juxtaposed magnetic switch during a vertical travel of ⅜ of an inch. It will also be assumed that the magnetic switches 5 on each side of the square conductor 17a are spaced apart 1 inch. With this arrangement the contiguous switches in the spiral configuration will be spaced apart in a vertical direction ¼ of an inch. As the float sections 18a and 18b rise from the lowermost position where the floats engage the stops 38, the sequence of the opening and closing of the switches $5_A$ to $5_K$ is shown by the heavy horizontal lines of the graphical representation of FIGURE 12. Thus, in the bottom position only the bottotm switch $5_A$ is closed by magnet action. When the float rises ¼ of an inch, switch $5_B$ is closed so that at that point switches $5_A$ and $5_B$ are both closed. The range of vertical travel of ⅛ of an inch during which both switches are closed is indicated by the crosshatched area of the diagram. When the continued upward travel of the floats exceeds ⅜ of an inch, switch $5_A$ opens, leaving switch $5_B$ closed. When the travel reaches ½ inch, both switches $5_B$ and $5_C$ are closed.

Similarly, as the upward movement of the floats continues, the contiguous switches are closed separately and in pairs in the same sequencing pattern. As a result of this switching sequence, the number of discrete positions of the float corresponding to a particular position of the indicator pointer is double the number of switches minus 1 so that, in effect, the resolution of the indicating system is almost doubled. The reason for this is the fact that when two contiguous switches are closed, the number of resistors 13 connected in series with the indicator coils 24 and 25 is different from the number so connected when either switch is closed individually. This is apparent from the following example referring to FIGURE 1, it being understood that a similar circuit arrangement would be used for connecting the switches and resistors shown in FIG. 11.

| Switch Closed | Resistors in series with indicator coil 25 | Resistors in series with indicator coil 24 |
| --- | --- | --- |
| $5_d$ | $13_a$, $13_b$, $13_c$ | $13_g$, $13_f$, $13_e$, $13_d$ |
| $5_d$ and $5_e$ | $13_a$, $13_b$, $13_c$ | $13_g$, $13_f$, $13_e$ |
| $5_e$ | $13_a$, $13_b$, $13_c$, $13_d$ | $13_g$, $13_f$, $13_e$ |

As an assembly technique after the switches 5 have been soldered in position on the conductor 17a and suitable electrical connections made between the adjacent resistor coils 13, the assembly is bound together by means of a helical wrapping of insulating tape identified by the numeral 43 in FIGURE 10. The assembly is then inserted inside the housing 4a. A screw plug 44 in the bottom of the housing 4a prevents entrance of the measured fluid in the tank. The top of the housing may be sealed in any suitable manner as by use of an O-ring.

From the foregoing it will be apparent that an electric position sensor constructed in accordance with the invention has many advantages. Thus, the novel use of sealed magnetic reed switches oriented and connected as shown in a measurement probe results in a compact construction which is exceedingly reliable and which will operate indefinitely without attention or service. The helical overlapping arrangement of the switches permits the construction of a thin probe having a measurement accuracy adequate for many applications on aircraft and other vehicles where space is at a premium and where reliability of operation is of utmost importance. Also, the use of sealed switches eliminates any fire hazard from sparking contacts and any problem of corroding contacts arising out of use in a contaminated atmosphere. Further, the system has the advantage of great flexibility since the number of switches used may be varied to obtain the desired sensitivity of indication. A still further advantage is that the system may be used with standard indicators of a type already widely used on aircraft because of their simplicity and reliability.

While the electric position sensor of the present invention has been illustrated as part of a liquid level indicating system wherein a float drives the magnetic actuator ring, it will be understood that the sensor may be used to transmit an electric indication of any form of mechanical movement. Thus, for example, the magnetic actuator ring which slides along the length of the probe and provides a magnetic field extending in the axial direction of the probe might be driven by a linkage actuating the flaps of an aircraft to provide a remote indication of flap position. Further, the system is not limited to transmission of an indication of linear mechanical movement. Thus, the housing 4 may be formed in the arc of a circle with the sliding magnet ring coupled to a crank arm to transmit an electrical indication of rotary movement.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. An electric position sensor comprising
    a tubular member
    a common conductor within the tubular member and extending along the length thereof,
    a plurality including at least three magnetically actuated, normally open switches within said tubular member, each of said switches comprising an elongated, hermetically sealed casing enclosing the switch with terminal wires extending from the ends of the switch casing,
    means connecting one of the terminal wires of each switch to said common conductor,
    means supporting the switches in a helical pattern extending axially of said tubular member,
    a plurality including at least two serially connected resistor coils, each coil being wound around the casing of an associated switch,
    means connecting the other terminal wire of all but two of the switches to the junctions between the resistor coils, the other terminal wires of the remaining two of the switches being connected to the two end connections of the serially connected coils,
    a magnet member mounted for movement along the length of said tubular member, said magnet member producing a magnetic field causing progressive and sequential closure of said magnetic switches as said magnet member moves along said probe, and
    means for moving said magnet member in accordance with a condition to be sensed.

2. An electric position sensor of the variable resistance type comprising
    a support member having a longitudinal axis,
    a plurality of magnetically actuated switches, each of said switches comprising an elongated hermetically sealed casing housing a pair of normally open switch contacts and means magnetically actuating said switch contacts to a closed position in response to a magnetic field of predetermined strength passing through said switch casing in the direction of the longitudinal axis thereof,
    means mounting said switches on said support member so that they are progressively displaced in the direction of the longitudinal axis of said support member with the longitudinal axis of the casing of each switch extending in a direction parallel to the longitudinal axis of said support member,
    a plurality of resistors electrically connected in series-circuit relation to provide terminal connections and a plurality of intermediate connections between the resistors,
    means electrically connecting one of the contacts of each of said switches to a common conductor,
    means electrically connecting the other contact of each of said switches to different ones of said intermediate and terminal connections so that the electrical resistance between said common conductor and one of said terminal connections progressively changes as said switches are progressively closed along the direction of the longitudinal axis of said support member,
    a magnet member guided for movement in the direction of the longitudinal axis of said support member so as to be sequentially positioned in juxtaposition with different ones of said switches, said magnet member being constructed to produce a magnetic field passing axially through the casing of each juxtaposed switch of sufficient strength to actuate the switch to a closed circuit position during a predetermined portion of the total length of travel of the magnet member whereby said switches are actuated in sequence during movement of said magnet member, said switches being disposed in a helical configuration about said axis of said support member and overlapped sufficiently in the direction of said longitudinal axis so that said magnet member causes simultaneous actuation of adjacent switches during a fractional part of the total travel of said magnet member between adjacent switches, and means for moving said magnet member.

3. An electric position sensor of the variable resistance type comprising
    a support member formed of electrically conducting material having a longitudinal axis,
    a plurality of magnetically actuated switches, each of said switches comprising an elongated hermetically sealed casing housing a pair of normally open switch contacts and means magnetically actuating said switch contacts to a closed position in response to a magnetic field of predetermined strength passing through said switch casing in the direction of the longitudinal axis thereof,
    means mounting said switches on said support member so that they are progressively displaced in the direction of the longitudinal axis of said support member with the longitudinal axis of the casing of each switch extending in a direction parallel to the longitudinal axis of said support member,
    a plurality of resistors electrically connected in series-circuit relation to provide terminal connections and a plurality of intermediate connections between the resistors,
    means electrically connecting one of the contacts of each of said switches to said support member,
    means electrically connecting the other contact of each of said switches to different ones of said intermediate and terminal connections so that the electrical resistance between said common conductor and one of said terminal connections progressively changes as said switches are progressively closed along the direction of the longitudinal axis of said support member,
    a magnet member guided for movement in the direction of the longitudinal axis of said support member so as to be sequentially positioned in juxtaposition with different ones of said switches, said magnet member being constructed to produce a magnetic field passing axially through the casing of each juxtaposed switch of sufficient strength to actuate the switch to a closed circuit position during a predetermined portion of the total length of travel of the magnet member whereby said switches are actuated in sequence during movement of said magnet member.

4. An electric position sensor of the variable resistance type comprising
    a support member having a longitudinal axis,
    a plurality of magnetically actuated switches, each of said switches comprising an elongated hermetically sealed casing housing a pair of normally open switch contacts and means magnetically actuating said switch contacts to a closed position in response to a magnetic field of predetermined strength passing through said switch casing in the direction of the longitudinal axis thereof, means mounting said switches on said support member so that they are progressively displaced in the direction of the longitudinal axis of said support member with the longitudinal axis of the casing of each switch extending in a direction parallel to the longitudinal axis of said support member, a plurality of resistors electrically connected in series-circuit relation to provide terminal connections and a plurality of intermediate connections between the resistors, each of said resistors comprising a coil of resistance wire wound around the casing of an associated switch, mean selectrically connecting one of the contacts of each of said switches to a common conductor, means electrically connecting the other contact of each of said switches to different ones of said intermediate and terminal connections so that the electrical resistance between said common conductor and one of said terminal connections progressively changes as said switches are progressively closed along the direction of the longitudinal axis of said support member, a magnet member guided for movement in the direction of the longitudinal axis of said support member so as to be sequentially positioned in juxtaposition with different ones of said switches, said magnet member being constructed to produce a magnetic field passing axially through the casing of each juxtaposed switch of sufficient strength to actuate the switch to a closed circuit position during a predetermined portion of the total length of travel of the magnet member whereby said switches are actuated in sequence during movement of said magnet member, and means for moving said magnet member.

References Cited by the Examiner

UNITED STATES PATENTS

| | | | |
|---|---|---|---|
| 1,617,287 | 2/27 | Huggins | 73—290.1 |
| 1,681,268 | 8/28 | Titcomb | 338—12 |
| 1,723,172 | 8/29 | Huggins | 73—290.1 |
| 2,484,690 | 10/49 | De Giers | 338—12 |

FOREIGN PATENTS

| | | |
|---|---|---|
| 505,784 | 9/51 | Belgium. |
| 577,636 | 6/24 | France. |
| 1,098,587 | 3/55 | France. |
| 865,821 | 2/53 | Germany. |

ISAAC LISANN, *Primary Examiner.*